(12) United States Patent
Doong et al.

(10) Patent No.: US 9,528,062 B2
(45) Date of Patent: *Dec. 27, 2016

(54) REMOVAL OF SULFUR COMPOUNDS IN AN ACID GAS STREAM GENERATED FROM SOLVENT-BASED GAS TREATING PROCESS

(71) Applicant: UOP LLC, Des Plaines, IL (US)

(72) Inventors: Shain-Jer Doong, Kildeer, IL (US); Lubo Zhou, Inverness, IL (US)

(73) Assignee: UOP LLC, Des Plaines, IL (US)

( * ) Notice: Subject to any disclaimer, the term of this patent is extended or adjusted under 35 U.S.C. 154(b) by 164 days.

This patent is subject to a terminal disclaimer.

(21) Appl. No.: 14/326,742

(22) Filed: Jul. 9, 2014

(65) Prior Publication Data

US 2015/0038759 A1 Feb. 5, 2015

Related U.S. Application Data

(60) Provisional application No. 61/860,510, filed on Jul. 31, 2013.

(51) Int. Cl.
 *C10L 3/10* (2006.01)

(52) U.S. Cl.
 CPC ............... *C10L 3/106* (2013.01); *C10L 3/101* (2013.01); *C10L 3/103* (2013.01); *C10L 3/104* (2013.01); *Y02C 10/06* (2013.01)

(58) Field of Classification Search
 CPC ........... C10L 3/106; C10L 3/103; C10L 3/104; C10L 3/102; B01D 53/1462; B01D 53/526; B01D 53/1425
 USPC ......... 95/173, 174, 179, 181, 183, 193, 199, 95/209, 223, 227, 228, 235, 236, 234, 95/242; 585/800 S
 See application file for complete search history.

(56) References Cited

U.S. PATENT DOCUMENTS

| 5,053,209 | A | 10/1991 | Yan |
| 8,926,737 | B2 * | 1/2015 | Chatterjee .......... B01D 53/1487 95/235 |
| 2004/0139855 | A1 | 7/2004 | Collins et al. |
| 2009/0130009 | A1 | 5/2009 | Kikkawa et al. |
| 2012/0240617 | A1 | 9/2012 | Weiss et al. |

FOREIGN PATENT DOCUMENTS

WO 2012092983 A1 7/2012

OTHER PUBLICATIONS

Search Report dated Nov. 18, 2014 for corresponding PCT Appl. No. PCT/US2014/047358.

* cited by examiner

*Primary Examiner* — Sharon Pregler

(57) ABSTRACT

The invention involves a process for treating a natural gas stream comprising sending the natural gas stream first to an adsorbent unit for removal of mercury. Then the gas stream is sent to an absorbent unit containing a chemical solvent and a physical solvent for removal of carbon dioxide, hydrogen sulfide, carbonyl sulfide and organic sulfur compounds to produce a partially purified natural gas stream. This stream is dehydrated and becomes the product stream. The partially purified natural gas stream to a dehydration unit to remove water to produce a natural gas product stream. The impurities absorbed by the absorption unit are removed and a liquid stream is separated that contains the sulfur impurities. This liquid stream may be purified and stabilized before being shipped for further treatment.

11 Claims, 1 Drawing Sheet

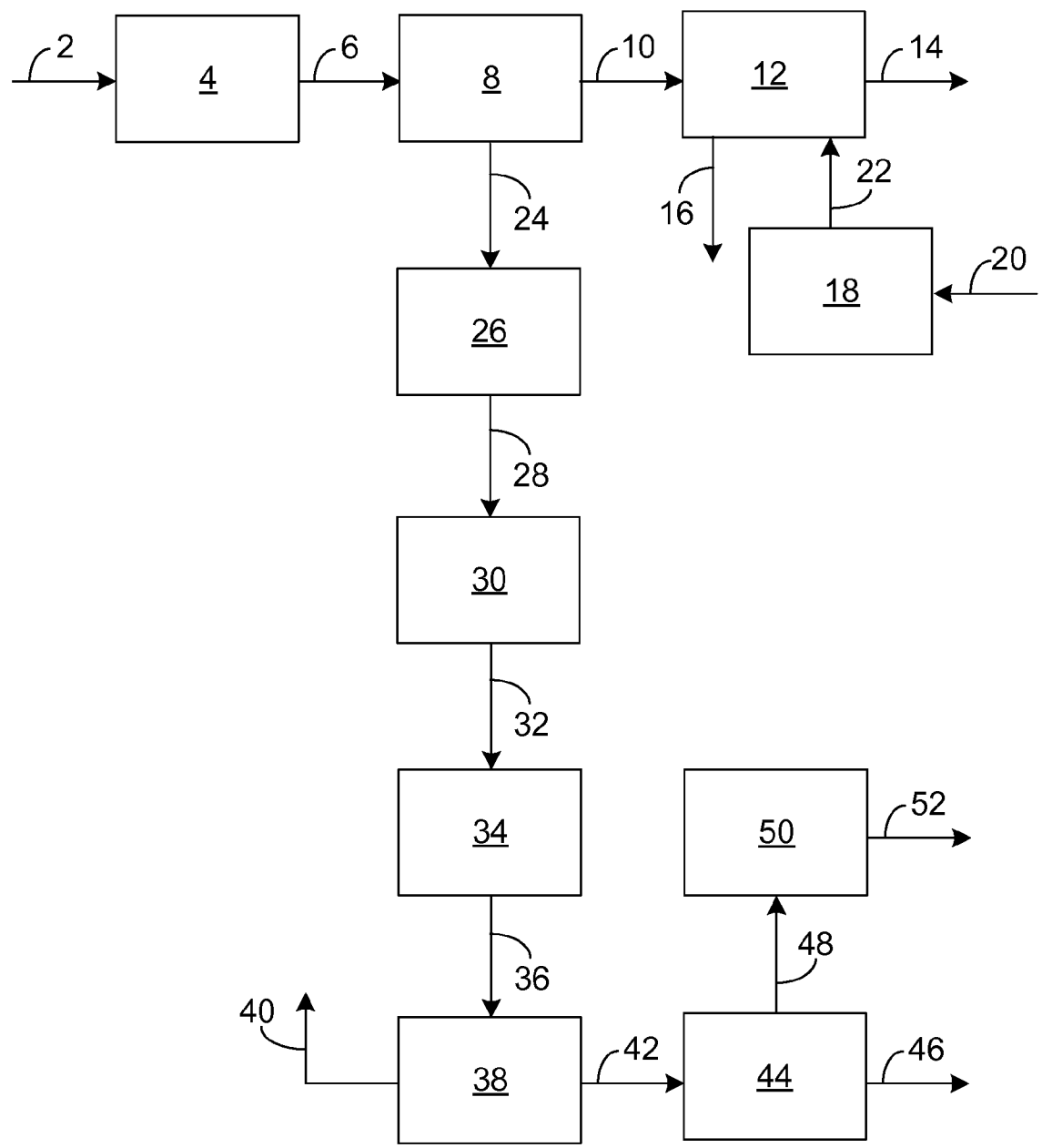

REMOVAL OF SULFUR COMPOUNDS IN AN ACID GAS STREAM GENERATED FROM SOLVENT-BASED GAS TREATING PROCESS

CROSS-REFERENCE TO RELATED APPLICATION

This application claims priority from Provisional Application No. 61/860,510 filed Jul. 31, 2013, the contents of which are hereby incorporated by reference.

BACKGROUND OF THE INVENTION

Operations for natural gas processing can range from simple treating and conditioning for pipeline delivery to complex operations needed to meet stringent specifications to produce pipeline sales gas or liquefied natural gas (LNG). The removal of acid gas compounds and other impurities such as $CO_2$, $H_2S$, COS, organic sulfur compounds, water and mercury is required to meet end product specifications and to avoid product blockages in the downstream process equipment. Such undesired blockages include frozen carbon dioxide and water. The level of treatment varies according to the treated gas product specifications and can vary according to local environmental regulations.

In general, mercury is removed by a non-regenerable guard bed and carbon dioxide and hydrogen sulfide are removed by a solvent process such as an amine process. Water is removed by a molecular sieve dehydration unit. A major challenge is to remove COS and organic sulfur compounds such as mercaptan, disulfide, and polysulfide. Historically, there are two types of flow schemes to remove these organic sulfur compounds to meet the product requirements. One type is gas-phase treatment, where the molecular sieve unit is designed to remove organic sulfur compounds that then pass into a regeneration gas stream. The regeneration gas can then be treated by a physical solvent unit such as that used by the Selexol™ process sold by UOP LLC to produce a sales or fuel gas and an acid gas stream containing the organic sulfur compounds. This acid gas stream, along with the acid gas generated in the amine unit, can be sent to a sulfur plant such as Claus process for sulfur recovery. The other scheme that is known is a liquid phase treatment, where all or most of the COS or organic compounds are allowed to slip through the dehydration unit. If a natural gas liquid (NGL) unit is in place, these sulfur compounds are expected to be concentrated in the NGL stream. The NGL liquids or after fractionation are then treated specifically for COS removal by a specialty amine unit. Mercaptans are then removed by a regenerable caustic process such as the Merox process from UOP LLC. Finally, the liquid is sulfur-polished by a molecular sieve unit to reduce the sulfur level to the required specification.

Both of these prior art processes require substantial capital and operational investments. The gas phase treatment option requires a sulfur plant. The liquid phase option requires an NGL unit. The liquid phase scheme also has an unattractive element in the caustic-based treatment and its associated spent caustic disposal problem. The sulfur plant is quite costly and is only justified when the sulfur level is sufficiently high. The use of an NGL plant is only justified when the gas is rich in $C_2$, $C_3$ and $C_4$ components. If the gas processing operator receives their feed gas from different supply sources, the feed gas sulfur level and/or its hydrocarbon contents may vary from time to time, which would not justify investment in a sulfur plant or the continuous operation of the NGL unit. Under this circumstance, an alternative sulfur capture technology is needed. The ideal solution is to remove the sulfur compounds from the natural gas stream and to turn these sulfur compounds into either a solid or a liquid form so that they can be physically transported out of the gas processing facility.

BRIEF DESCRIPTION OF THE DRAWING

The FIGURE shows a basic flow scheme of the process for treating natural gas and processing sulfur contaminants.

SUMMARY OF THE INVENTION

A process is provided for treating a natural gas stream. The process involves sending the natural gas stream to an adsorbent unit for removal of mercury. Then a mercury depleted natural gas stream is sent to an absorbent unit containing a chemical solvent and a physical solvent for removal of carbon dioxide, hydrogen sulfide, carbonyl sulfide and organic sulfur compounds to produce a partially purified natural gas stream. The partially purified natural gas stream is sent to a dehydration unit to remove water to produce a natural gas product stream. The sulfur compounds from the absorbent unit are removed in a regeneration stream to produce a liquid comprising the sulfur compounds. The chemical solvents that are used include those that are known for treatment of natural gas including amines, ammonia, potassium carbonate, sodium carbonate and mixtures thereof. The physical solvent is selected from the group consisting of dimethyl ethers of polyethylene glycol, propylene carbonate, methanol, N-methyl-2-pyrrolidone, sulfolanes and mixtures thereof. In the process, a liquid comprising sulfur compounds and a residual gas may be separated from the regeneration gas. In the process the regeneration gas is compressed, dried and cooled prior to separation of the liquid comprising the sulfur compounds. A residual gas may be produced containing methane that may be recycled to the absorbent unit. The natural gas product stream may be further processed to remove natural gas liquids. The natural gas product may be sent to a gas pipeline or to a liquefaction unit. The product that is produced is dry and sulfur-free. Heavier hydrocarbons in the natural gas stream may be removed by the adsorbent unit.

DESCRIPTION OF THE INVENTION

As described above for the gas-phase treatment route, chemical solvent processes such as amine absorbent processes remove carbon dioxide and hydrogen sulfide and are not able to remove organic sulfur compounds to meet product specifications. The majority of chemical solvents are organic amine based including sterically hindered amines which were developed to enhance the absorption capacity of the solvent. Monoethanolamines are the most used amines in the carbon dioxide absorption market. Alternative chemical solvents that can be used include sodium and potassium carbonates and aqueous ammonia processes. Physical solvents such as DEPG (dimethyl ether of polyethylene glycol), propylene carbonate, methanol, NMP (N-methyl-2-pyrrolidone), and sulfolane are known to remove organic sulfurs very effectively. Combining both chemical and physical solvents, also known as mixed solvents or hybrid solvents have also been used in industry for removing all sulfur species from the natural gas. However, physical solvents have the disadvantage of coabsorbing heavy hydrocarbons, which can create operational issues for the downstream Claus sulfur plant. In the case that a sulfur plant is not justified due to an expectation that the quantities of sulfur will not support the inclusion of a sulfur plant, there still is the issue that the sulfur must be removed. The acid gas generated from the regeneration step of a mixed solvent process contains sulfur and a destination for it is needed.

The FIGURE is a schematic process diagram of the system and process of the invention. The gas is first treated by a mercury guard bed to remove mercury. The mercury adsorber may be a metal oxide-based material supported in an alumina substrate. The gas then enters a solvent unit containing a hybrid or mixed chemical and physical solvent to remove carbon dioxide, hydrogen sulfide, carbonyl sulfide and organic sulfur compounds. In an embodiment of the invention, the chemical absorbent is an amine such as a monoethanolamine and the physical absorbent is a dimethyl ether of polyethylene glycol. Other hybrid absorbents may be employed as known to those skilled in the art. The ratio of chemical to physical absorbent may vary from 1:10 to 10:1. Some heavy hydrocarbons are also expected to be removed at this step. The gas which still contains water is fed to a molecular sieve unit to remove the water to required specification levels. The treated gas, which is now dry and nearly sulfur-free, is sent to the down-stream processing unit, NGL or LNG train or to the gas pipeline.

More specifically, in the FIGURE, a natural gas stream 2 is first sent to an adsorbent guard bed 4 to remove mercury impurities. Mercury is usually the first impurity to be removed due to its detrimental impact upon equipment. A mercury depleted natural gas stream 6 is then sent to a column 8 that contains a hybrid solvent that is a mixture of one or more chemical solvents and one or more physical solvents. This hybrid solvent removes carbon dioxide, and sulfur compounds as well as some heavier hydrocarbons. The main remaining step for purification of the natural gas stream 10 is to be dehydrated in an adsorbent unit 12. The purified natural gas 16 may be then sent for further treatment to remove any natural gas liquids. A boil-off gas 20 may be sent through chamber 18 through adsorbent unit 12 to remove water. A regeneration gas may assist in removal of impurities from column 8 through line 24. This regeneration contains all of the impurities from the column 8 including carbon dioxide, hydrogen sulfide, carbonyl sulfide, organic sulfur compounds and coabsorbed hydrocarbons. The gas is then compressed in compressor 26, passes through line 28 to a dehydrator 30, line 32 to chiller 34 and then to gas/liquid separator or absorber 38. The gas 40 that is removed may then be recycled to column 8. The liquid 42 that now contains the sulfur compounds removed from the natural gas stream may then pass to a stabilizer such as a distillation column 44 and a liquid 46 containing the sulfur product may be sent to a truck for further treatment or disposal. A residual gas 48 from the stabilizer may then be sent to an adsorbent bed 50 to remove carbon dioxide and light sulfur species such as hydrogen sulfide and carbonyl sulfide. The purified gas 52 may then be vented to the atmosphere.

The regeneration gas from the hybrid solvent unit, which contains all removed sulfur compounds and water, is first cooled to knock out water. The gas is compressed to a high pressure between 2 and 100 bar, preferable between 10 and 40 bar. It is then further dried in a small MolSiv unit to remove water down to ppm level. This is followed by a chiller to cool the gas temperature sufficiently to condense the majority of this gas stream. The majority of the acid gas components, carbon dioxide, hydrogen sulfide, carbonyl sulfide and organic sulfur compounds will enter into the liquid stream along with some heavy hydrocarbons. The gas, which is separated from a gas-liquid separator, is returned to the feed end of the absorber unit, after boosting its pressure by a blower if necessary. The liquid stream is sent to a distillation column to stabilize the liquid. The liquid can be trucked off-site to a nearby refinery in its hydro processing unit. The residue gas from the stabilizer, which mainly contains carbon dioxide and light sulfur species, hydrogen sulfide and carbonyl sulfide can be adsorbed by an adsorbent bed such as UOP LLC's GB220 copper oxide adsorbent. The spent adsorbent can be disposed of as a solid waste or sent to a third party for reclaiming the metal contents of the adsorbent.

The process provides a number of advantages over the known processes for sulfur removal. There is no need for a sulfur plant for the processing of solid sulfur or for an NGL unit for sulfur removal in the liquid phase. Since there is no NGL plant, there is no need for caustic treatment of the NGL liquid. The molecular sieve adsorption unit does not need to remove sulfur and only needs to be designed for dehydration. Since all sulfur species are either converted to liquid form or sequestered in a solid adsorbent, they can be easily transported off-site. There is minimum or no hydrocarbon loss especially if the liquid is sold to a refinery for further processing. There is a likelihood of success in operation of the equipment with the use of commercially proven technology components including solvent, adsorbent dehydration bed, propane chilling and adsorbent guard beds.

The following examples demonstrate the use of the current invention. Modifications may be made to the process described below as would be made by those of ordinary skill in the art to treat natural gas with differing compositions and flow rates.

EXAMPLE 1

A natural gas stream at a flow rate of 19.6 MM m$^3$ per day at 43 bar and 45° C. with a composition shown in the following Table is to be treated for removal of water, carbon dioxide and sulfur impurities before being sent into a LNG train for cryogenic treatment. Using the process flow scheme from the current invention as shown in the FIGURE, mercury is removed by an adsorbent such as copper based UOP GB 562 adsorbent. Carbonyl sulfide is partially converted to hydrogen sulfide in the same adsorbent bed. The carbonyl sulfide level is further reduced by the hybrid solvent unit down to about 2 ppm. Carbon dioxide levels are reduced to below 50 ppm and hydrogen sulfide to 1 ppm by the same solvent unit. The product gas from the solvent unit is sent to an adsorbent bed such as a 4-bed adsorbent dehydration unit to lower the water level to 0.1 ppm. The final product compositions are also shown in the following Table.

The acid gas released from the solvent unit, which contains mostly carbon dioxide, virtually all of the sulfur compounds, water and some heavier hydrocarbons is first sent to a knock out drum to remove any free liquid, primarily liquid water. The gas is then compressed to about 46 bar. The compressed gas is dried by a MolSiv dehydration unit to remove its water content to below 1 ppm. The gas is chilled by a mechanical refrigeration unit to a temperature of about 0° C. The non-condensed gas from the gas-liquid separator is returned to the inlet of the solvent absorber. The condensed liquid as collected from a gas-liquid separator is sent to a stabilizer to produce a carbon dioxide-enriched gas stream and a sulfur species-enriched liquid stream.

The carbon dioxide-enriched gas stream, its composition shown in the following Table, is first treated in a non-regenerable adsorber to remove its sulfur components, hydrogen sulfide and carbonyl sulfide before released to atmosphere. Optionally, this carbon dioxide-rich stream can be used for well reinjection. The sulfur species-enriched liquid, its composition also shown in the last column of the following Table, can be trucked off-site to a refinery.

EXAMPLE 2

This example is the same as Example 1 except that the acid gas is compressed to about 25 bar and the gas is chilled to −25° C. Under these conditions, the necessary compressor power is reduced from about 1.9 Mw in Example 1 to about 1.5 Mw for this example. However, the chiller duty requirements are increased from 2.4 MMBtu/hr in Example 1 to 3.9 MMBtu/hr in this example.

TABLE

Gas Compositions for Example 1

|  | Feed | Product | $CO_2$-rich | Liquid |
|---|---|---|---|---|
| Temperature, ° C. | 28.82 | 24.00 | −42.30 | 39.96 |
| Pressure, bar | 43.48 | 42.50 | 10.00 | 10.50 |
| Molar Flow, MM m$^3$/day | 18.97 | 18.76 | 0.193 | 0.016 |
| Mass Flow, kg/hr | 603969.17 | 587646.26 | 14169.41 | 1919.30 |
| Mole Fractions |  |  |  |  |
| Nitrogen | 3.80E−03 | 3.84E−03 | 0 | 0 |
| Carbon Dioxide | 9.60E−03 | 5.44E−04 | 0.888175 | 8.25E−02 |
| Methane | 0.913972 | 9.24E−01 | 6.11E−02 | 5.32E−07 |
| Ethane | 4.19E−02 | 4.20E−02 | 0.034367 | 1.95E−02 |
| Propane | 0.017294 | 1.73E−02 | 1.11E−02 | 6.05E−02 |
| Isobutane | 3.10E−03 | 3.07E−03 | 1.59E−03 | 5.32E−02 |
| n-Butane | 4.80E−03 | 4.76E−03 | 8.40E−04 | 0.103287 |
| n-Pentane | 1.60E−03 | 1.49E−03 | 2.46E−06 | 0.153618 |
| Isopentane | 1.40E−03 | 1.30E−03 | 1.48E−05 | 0.134018 |
| n-Hexane | 2.30E−03 | 2.05E−03 | 4.25E−09 | 0.331667 |
| Cyclohexane | 1.59E−05 | 1.29E−05 | 7.97E−14 | 3.78E−03 |
| Benzene | 1.60E−05 | 8.12E−06 | 9.78E−14 | 9.51E−03 |
| Water | 1.20E−04 | 0.00E+00 | 0 | 0 |
| Hydrogen Sulfide | 2.80E−06 | 3.17E−08 | 2.57E−03 | 3.10E−03 |
| Carbonyl Sulfide | 3.28E−05 | 1.45E−06 | 2.50E−04 | 3.62E−03 |
| Methyl Mercaptan | 1.01E−05 | 1.03E−08 | 1.41E−07 | 1.22E−02 |
| Ethyl Mercaptan | 3.57E−06 | 3.63E−09 | 2.93E−11 | 4.31E−03 |
| n-Propyl Mercaptan | 2.95E−06 | 2.99E−09 | 4.81E−16 | 3.52E−03 |
| Phenyl Mercaptan | 1.52E−05 | 1.52E−08 | 8.94E−28 | 8.95E−03 |
| Dimethyl Sulfide | 1.73E−06 | 1.76E−09 | 2.15E−12 | 2.09E−03 |
| Carbon Disulfide | 2.83E−06 | 2.88E−09 | 1.51E−11 | 3.42E−03 |
| Methyl Ethyl Sulfide | 8.27E−07 | 8.38E−10 | 3.35E−16 | 9.91E−04 |
| Dimethyl Sulfide | 1.12E−06 | 1.13E−09 | 1.07E−20 | 1.25E−03 |
| Ethyl Methyl Disulfide | 1.65E−06 | 1.66E−09 | 4.83E−25 | 1.54E−03 |
| Diethyl Disulfide | 8.26E−07 | 8.30E−10 | 5.02E−29 | 5.87E−04 |
| Benzothiophene | 2.50E−05 | 2.36E−08 | 9.71E−31 | 2.62E−03 |
| 2-Methyl Benzothiophene | 5.79E−06 | 4.70E−09 | 9.98E−31 | 1.32E−04 |

SPECIFIC EMBODIMENTS

While the following is described in conjunction with specific embodiments, it will be understood that this description is intended to illustrate and not limit the scope of the preceding description and the appended claims.

A first embodiment of the invention is a process for treating a natural gas stream comprising a) sending the natural gas stream to an absorbent unit containing a chemical solvent and a physical solvent for removal of carbon dioxide, hydrogen sulfide, carbonyl sulfide and organic sulfur compounds to produce a partially purified natural gas stream; b) then sending the partially purified natural gas stream to a dehydration unit to remove water to produce a natural gas product stream; and c) removing the sulfur compounds from the absorbent unit to produce a liquid comprising the sulfur compounds. An embodiment of the invention is one, any or all of prior embodiments in this paragraph up through the first embodiment in this paragraph further comprising sending the natural gas stream to an adsorbent unit for removal of mercury. An embodiment of the invention is one, any or all of prior embodiments in this paragraph up through the first embodiment in this paragraph wherein the chemical solvent is selected from the group consisting of amines, ammonia, potassium carbonate and sodium carbonate. An embodiment of the invention is one, any or all of prior embodiments in this paragraph up through the first embodiment in this paragraph wherein the physical solvent is selected from the group consisting of dimethyl ethers of polyethylene glycol, propylene carbonate, methanol, N-methyl-2-pyrrolidone, and sulfolane. An embodiment of the invention is one, any or all of prior embodiments in this paragraph up through the first embodiment in this paragraph wherein a liquid comprising sulfur compounds and a residual gas are separated from a regeneration gas. An embodiment of the invention is one, any or all of prior embodiments in this paragraph up through the first embodiment in this paragraph wherein a regeneration gas is compressed, dried and cooled prior to the separation of the liquid comprising the sulfur compounds. An embodiment of the invention is one, any or all of prior embodiments in this paragraph up through the first embodiment in this paragraph wherein the residual gas is recycled to the absorbent unit. An embodiment of the invention is one, any or all of prior embodiments in this paragraph up through the first embodiment in this paragraph wherein the natural gas product stream is further processed to remove natural gas liquids. An embodiment of the invention is one, any or all of prior embodiments in this paragraph up through the first embodiment in this paragraph wherein the natural gas product is sent to a gas pipeline or to a liquefaction unit. An embodiment of the invention is one, any or all of prior embodiments in this paragraph up through the first embodiment in this paragraph wherein the natural gas product is dry and sulfur-free. An embodiment of the invention is one, any or all of prior embodiments in this paragraph up through the first embodiment in this paragraph wherein a portion of heavy hydrocarbons in the natural gas stream are removed by the adsorbent unit.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for treating a natural gas stream comprising:
   a) sending said natural gas stream to an absorbent unit containing a chemical solvent and a physical solvent for removal of carbon dioxide, hydrogen sulfide, carbonyl sulfide and organic sulfur compounds to produce a partially purified natural gas stream;
   b) then sending said partially purified natural gas stream to a dehydration unit to remove water to produce a natural gas product stream; and
   c) removing said sulfur compounds from said absorbent unit to produce a liquid comprising said sulfur compounds and
   d) regenerating said absorbent unit by removing a regeneration gas containing sulfur compounds and water, cooling said regeneration gas to knock out water, then compressing said regeneration gas followed by cooling to condense a majority of said regeneration gas.

2. The process of claim 1 further comprising first sending said natural gas stream to an adsorbent guard bed for removal of mercury and then sending said natural gas stream to said absorbent unit.

3. The process of claim 1 wherein said chemical solvent is selected from the group consisting of amines, ammonia, potassium carbonate and sodium carbonate.

4. The process of claim 1 wherein said physical solvent is selected from the group consisting of dimethyl ethers of polyethylene glycol, propylene carbonate, methanol, N-methyl-2-pyrrolidone, and sulfolane.

5. The process of claim 1 wherein a liquid comprising sulfur compounds and a residual gas are separated from a regeneration gas.

6. The process of claim 1 wherein a regeneration gas is compressed, dried and cooled prior to said separation of said liquid comprising said sulfur compounds.

7. The process of claim 5 wherein said residual gas is recycled to said absorbent unit.

8. The process of claim 1 wherein said natural gas product stream is further processed to remove natural gas liquids.

9. The process of claim 1 wherein said natural gas product is sent to a gas pipeline or to a liquefaction unit.

10. The process of claim 1 wherein said natural gas product is dry and sulfur-free.

11. The process of claim 1 wherein a portion of heavy hydrocarbons in said natural gas stream are removed by said absorption unit.

* * * * *